350-3.74 SR
OR 3,761,155 X 3049W
(2)

United States Patent [11] 3,761,155
Lo et al. [45] Sept. 25, 1973

[54] FARADAY EFFECT PAGE COMPOSER FOR HOLOGRAPHIC MEMORY SYSTEM

[75] Inventors: David S. Lo, Burnsville; Marlin M. Hanson, Cologne; Alan D. Kaske, Minneapolis; Donald M. Manikowski, Bloomington, all of Minn.

[73] Assignee: Sperry Rand Corporation, New York, N.Y.

[22] Filed: Dec. 27, 1971

[21] Appl. No.: 212,275

[52] U.S. Cl. .................. 350/3.5, 350/151
[51] Int. Cl. .................. G02b 27/00
[58] Field of Search .................. 350/3.5, 151; 340/173 LT, 173 LM, 173 LS, 174 YC

[56] References Cited

UNITED STATES PATENTS

| | | | |
|---|---|---|---|
| 3,530,442 | 9/1970 | Collier et al. | 350/3.5 |
| 3,614,200 | 10/1971 | Taylor | 350/151 |

*Primary Examiner*—David Schonberg
*Assistant Examiner*—Ronald J. Stern
*Attorney*—Kenneth T. Grace et al.

[57] ABSTRACT

A holographic memory system having an electrically alterable page composer or data mask and a method of modulating a plane polarized laser beam thereby for generating a hologram in the holographic storage medium is disclosed. The method utilizes as the data mask a planar platelet of magnetizable magneto-optic material in which a two-dimensional array of discrete saturated magnetic domains, each domain having its magnetization vector M aligned in a first or a second and opposite direction normal to the plane of the platelet, is selectively written. The magnetic domains produce a Faraday or Kerr effect rotation of the respectively associated plane polarized portions of the incident laser beam for generating a spatially varying rotation of the plane of polarization of such portions of the laser beam, the spatial distribution of which portions is a function of the spatially positioned magnetic domains.

2 Claims, 8 Drawing Figures

FARADAY EFFECT PAGE COMPOSER FOR HOLOGRAPHIC MEMORY SYSTEM

BACKGROUND OF THE INVENTION

Holographic memory systems generally include an optical system for generating or composing a two-dimensional array or page of data and means for storing such page of data in a holographic storage medium that is capable of storing a plurality of such pages along orthogonal X, Y coordinates. Each page is then optically accessed for readout and use. Such optical system, including the holographic storage medium—see the article "Materials for Optical Memories," R. W. Damon, et al., Electro-Optical Systems Design, August 1970, pages 68 – 77— are well defined; however, the page composer is the one element that is continually undergoing redefinition. In the article "Holographic Optical Memory," J. A. Rajchman, Applied Optics, October 1970, Vol. 9, No. 10, pages 2269 – 2274, the page composer is a two-dimensional array of storing cells, each associated with a light valve which lets light through or shuts it off according to the state of the cell. The present invention is considered to be an improvement over such prior art page composer system.

SUMMARY OF THE INVENTION

The present invention is directed toward an improved holographic memory system that includes an electrically alterable page composer using, e.g., a platelet or thin layer of magnetizable material of orthoferrite, hexagonal ferrites or garnets as the page composer medium—see the article "Magnetic Bubbles," A. H. Bobeck, et al., Scientific American, September 1970, pages 68 – 90. The page composer is thus essentially a two-dimensional layer of magnetizable material associated with the necessary drive conductors and controls for selectively writing vel non cylindrical domains therein in an orthogonal X, Y axes array. The page composer has either a Faraday or Kerr effect rotation upon an incident laser beam that is polarized along a given polarization axis by a plane polarizer.

The magnetizable layer is initially uniformly magnetically oriented in a first magnetization direction normal to its plane surface with the magnetization of the selectively written cylindrica; domains magnetically oriented in a second polarity opposite to the first polarity. The normally incident object beam is rotated in a first, e.g., counterclockwise, direction by the magnetizable layer that is set into the first magnetization direction and is rotated in a second, e.g., clockwise, direction by the cylindrical domains of the magnetizable layer as the plane polarized object beam is transmitted through the magnetizable layer. The transmitted object beam is then directed incident upon a plane analyzer which passes those portions of the object beam that have been rotated in the clockwise direction by the cylindrical domains but does not pass those portions of the object beam that have been rotated in a counterclockwise direction by the unswitched portion of the magnetizable layer. The transmitted portions of the object beam are then directed incident upon a holographic storage medium which in coincidence with a reference beam stores or writes in the holographic storage medium the data that is carried by the incident portion of the object beam as affected by the magnetizable layer.

BRIEF DESCRIPTION OF THE PREFERRED EMBODIMENTS

Figure 1:
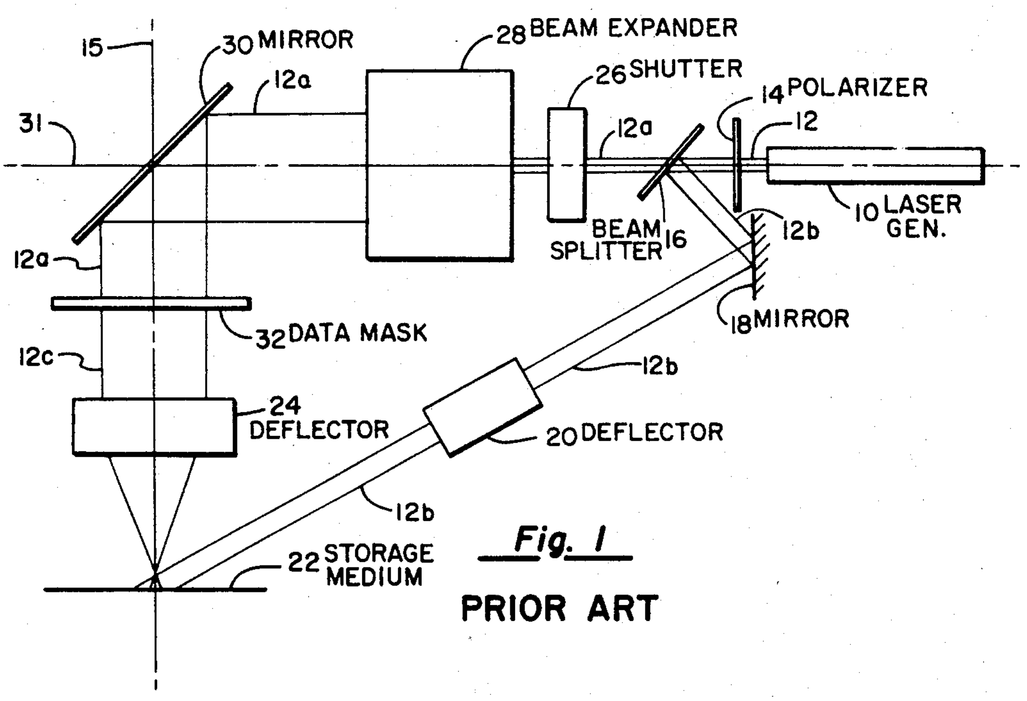
Fig. 1 PRIOR ART
FIG. 1 is an illustration of a prior art holographic memory system.

With particular reference to FIG. 1 there is presented an illustration of a prior art holographic memory system. In this system generator 10 generates a coherent monochromatic light beam such as a laser beam 12 that is directed along transmission axis 13 incident upon a plane polarizer 14 which polarizes beam 12 along a first polarization axis, e.g., perpendicular to the plane of the paper. The plane polarized beam 12 is then incident upon a beam splitter 16 which splits beam 12 into two beams: object beam **12*a* and a reference beam 12*b*. Reference beam 12*b* is reflected off beam splitter 16, off mirror 18 and onto reference beam deflector 20 from whence it is focused incident upon holographic storage medium 22 at a particular position or two-dimensional plane area defined as a page. Storage medium 22 contains a plurality of such pages that are oriented in a two-dimensional array along orthogonal X, Y axes and which are concurrently electrically accessed by reference beam 12*b* deflector 20 and object beam 12*c* deflector 24. Concurrently, object beam 12*a* passes from beam splitter 16 onto shutter 26, which may be of the electro-optic or acousto-optic type, which selectively passes vel non object beam 12*a* onto beam expander 28. From beam expander 28 the expanded object beam 12*a* passes onto mirror 30 and thence is directed along transmission axis 15 incident to data mask 32.**

Data mask 32 is of the type that is constructed of a plurality of discrete data cells representing the binary digit or bits "1" or "0" which bits are oriented in a two-dimensional array along orthogonal X, Y axes. Each bit passes vel non, e.g., a "1" passes a portion of object beam **12*a* while a "0" passes no portion of object beam 12*a*, a respectively associated portion of the expanded object beam 12*a* generating a plurality of parallel object beams 12*c* whose spatial distribution in a plane normal to the transmission axis 15 conforms to the spatial distribution of the "1" bits recorded in the nonalterable data mask 32—see the patent application of F. G. Hewitt, Ser. No. 885,782 filed Dec. 17, 1969, now U.S. Pat. No. 3,639,744. The object beams 12*c* pass onto the deflector 24 which focuses or compresses the plurality of parallel object beams 12***c* onto a particular position or page on holographic storage medium 22. The concurrent application of reference beam 12*b* and the plurality of object beams 12*c* on the one selected page of holographic storage medium 22 writes-in or stores therein a hologram of the information stored in data mask 32.

Figure 2:
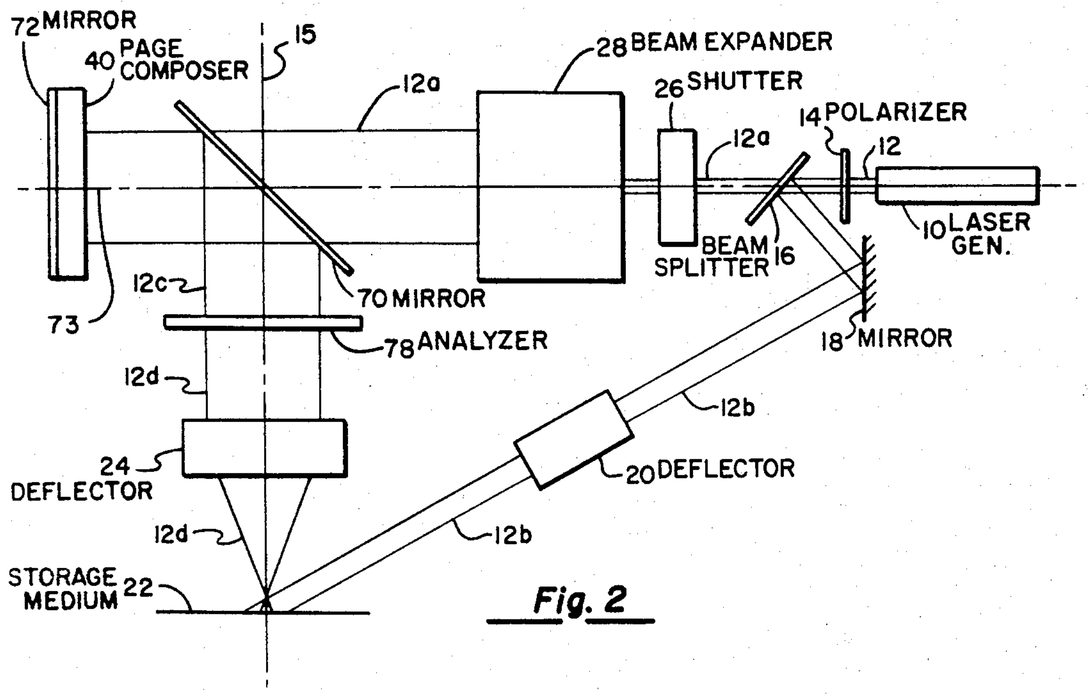
FIG. 2 is an illustration of a holographic memory system incorporating the present invention.

With particular reference to FIG. 2 there is presented an illustration of a holographic memory system incorporating the present invention wherein like components of FIG. 1 are identified by like reference numbers. In this improved holographic memory system the nonalterable data mask 32 of FIG. 1 is replaced by an electrically alterable page composer 40. Page composer 40 includes a thin planar layer of magnetizable material whose magnetization vector M is capable of being saturably magnetized in first or second and opposite directions normal to the plane surface of the layer and which produces a Faraday effect rotation of an incident plane-polarized coherent monochromatic light beam such as laser beam 12.

Figure 3:
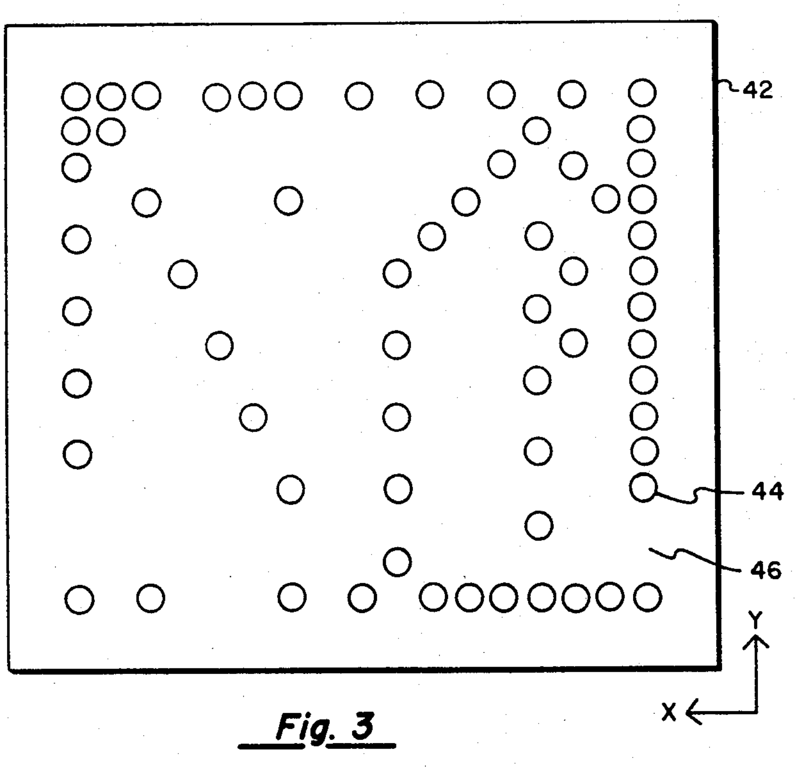
FIG. 3 is an illustration of a platelet of magnetizable material included in the page composer of the present invention.

With particular reference to FIG. 3 there is presented an illustration of a page composer 40 depicting only the planar platelet 42 of a magnetizable material in which a plurality of cylindrical domains 44, having a magnetization vector M directed vertically out of the paper, are established in a two-dimensional array along orthogonal X, Y axes by drive conductors and controls not illustrated—see the article "A New Approach to Memory and Logic-Cylindrical Domain Devices," A. H. Bobeck, et al., Proceedings of the Fall Joint Computer Conference, 1969, pages 489 - 498. The magnetization vector M of the platelet 42 is initially uniformly magnetically oriented in a first magnetization direction normal to its plane surface, e.g., directed downward into the paper, with the magnetization of the selectively written cylindrical domains 44 magnetically oriented in a second magnetization direction opposite to the first magnetization direction, e.g., directed verticaly upward out of the paper. Thus, selected portions 44 of the magnetizable material are switched in a second magnetization direction directed vertically upward out of the paper while the remaining portion 46 of the magnetizable material remains in its initial first magnetization direction directed vertically downward into the paper.

Figure 4:
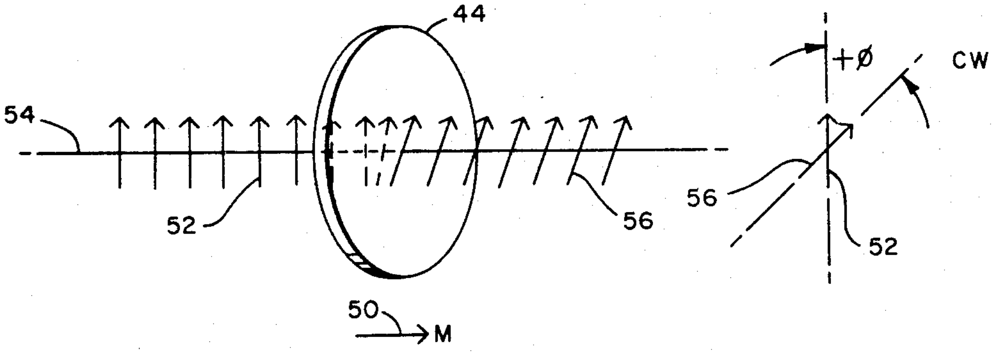
FIG. 4 is an illustration of the Faraday effect rotation upon an incident laser beam by the second magnetization vector direction of a selectively switched cylindrical domain of the platelet of FIG. 3.

With particular reference to FIG. 4 there is presented a schematic illustration of the Faraday effect rotation by the magnetization direction 50 of the magnetization vector M of a cylindrical domain 44 of platelet 42, upon an incident object beam 12*a* that is plane polarized along polarization axis 52 by plane polarizer 14 of FIG. 2. Object beam 12*a* is directed incident to the planar surface of a cylindrical domain 44 of platelet 42 along a transmission axis 54 which is normal to the planar surface of cylindrical domain 44. As object beam 12*a* passes through cylindrical domain 44 it undergoes a Faraday effect clockwise rotation through an angle $+\phi$ being rotated clockwise from the first plane polarization axis 52 into the second plane polarization axis 56.

Figure 5:
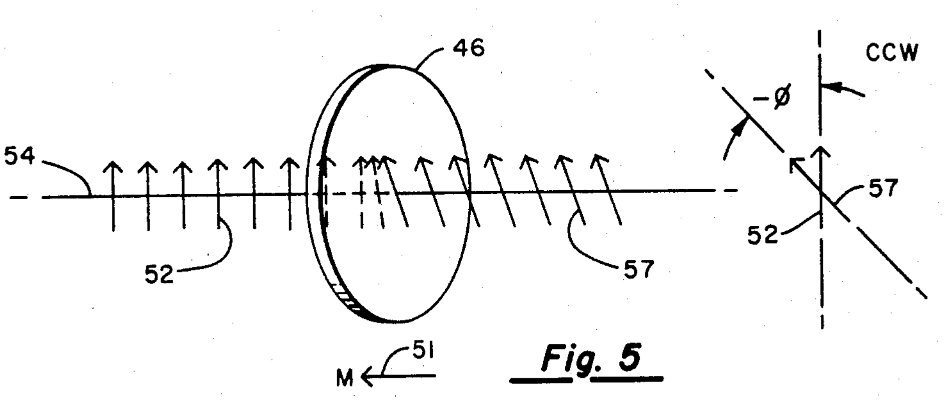
FIG. 5 is an illustration of the Faraday effect rotation upon an incident laser beam by the first magnetization vector direction of the platelet of FIG. 3.

With particular reference to FIG. 5 there is presented a schematic illustration of the Faraday effect rotation, by the magnetization direction 51 of the magnetization vector M of the portion 46 which is that portion of platelet 42 not including cylindrical domains 44, upon an incident object beam 12*a* that is plane polarized along polarization axis 52 by plane polarizer 14 of FIG. 2. Object beam 12*a* is directed incident to the planar surface of portion 46 of platelet 42 along a transmission axis 54 which is normal to the planar surface of portion 46. As object beam 12*a* passes through portion 46 it undergoes a Faraday effect counterclockwise rotation through an angle $-\phi$ being rotated counterclockwise from the first plane polarization axis 52 into the third plane polarization axis 57.

Figure 6:
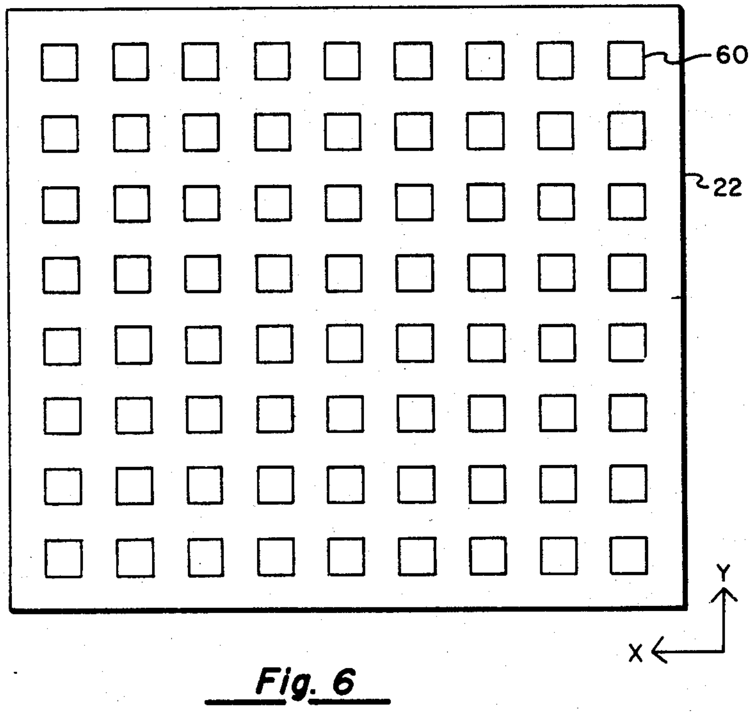
FIG. 6 is an illustration of a holographic storage medium in which are stored a plurality of holograms.

With particular reference to FIG. 6 there is presented a schematic illustration of a holographic storage medium 22 in which there are stored a plurality of pages 60 organized along orthogonal X, Y axes. Each of the pages 60 is the hologram of the data held in the respectively associated page of platelet 42 as composed by page composer 40 of FIG. 2 and is stored therein by the conjoint action of object beam 12*c* and reference beam 12*b*. Reference beam 12*b* deflector 20 and object beam 12*c* deflector 24 are digitally controlled by electrical means, along with shutter 26, to electrically access; by the proper optical focusing, any one page 60 along the X, Y axes coordinates.

With reference back to FIG. 2 the expanded object beam 12*a* is directed incident to and passes through the front side of beam splitter 70 impinging upon platelet 42 of page composer 40—see FIG. 3. Object beam 12*a* passes through page composer 40 and is deflected back through page composer 40 by mirror 72 as object beam 12*c* and then onto the back side of beam splitter 70. Object beam 12*a*, being plane polarized by polarizer 14, as it passes through platelet 42 of page composer 40 is selectively affected by the spatial distribution of the polarization of the magnetization vector M—see FIGS. 4,5—of platelet 42 as determined by the spatial distribution of the cylindrical domains 44. If platelet 42 contains no cylindrical domains 44, the entire object beam 12*a*, in a plane normal to its transmission axis 13, is uniformly affected by the Faraday effect and is uniformly rotated in the counterclockwise direction as illustrated in FIG. 5. Upon being reflected by mirror 72 the object beam 12*a* is further uniformly rotated in a counterclockwse direction as illustrated in FIG. 5 resulting in a total counterclockwise rotation of $-2\phi$. However, assuming that platelet 42 does have a plurality of cylindrical domains 44 established therein, object beam 12*a*, as it passes through platelet 42 of page composer 40, is selectively affected by the spatial distribution of such cylindrical domains 44 whereby those portions of object beam 12*a* that are incident upon the cylindrical domains 44 are uniformly affected by the Faraday effect and are uniformly rotated in a clockwise direction as illustrated in FIG. 4 while those portions of object beam 12*a* that are incident upon the remaining portions 46 of platelet 42 are uniformly affected by the Faraday effect and are uniformly rotated in the counterclockwise direction as illustrated in FIG. 5. Upon being reflected by mirror 72 the respective portions of object beam 12*a* are further uniformly rotated in respective clockwise and counterclockwise directions whereby in a plane normal to its transmission axis 13 the object beam 12*c* is selectively affected by the spatial distribution of the cylindrical domains 44 resulting in a total clockwise rotation of $+2\phi$ while the remaining portions of object beam 12*c* are uniformly rotated counterclockwise $-2\phi$. Those portions of object beam 12*c* that are selectively rotated clockwise $+2\phi$, while the remaining portions of object beam 12*c* are uniformly rotated counterclockwise $-2\phi$, define the information or data that has been composed by page composer 40 and that is to be written in holographic storage medium 22.

Object beam 12*c*, now containing the informaton composed by page composer 40 is reflected off the back side of beam splitter 70 and is directed along transmission axis 15 and upon analyzer 78. Analyzer 78 has an axis of polarization that is aligned with the clockwise $+2\phi$ axis of those portions of object beam 12*c* that were affected by the cylindrical domains 44 of platelet 42 of page composer 40 whereby those portions of object beam 12*c* that were rotated clockwise $+2\phi$ are passed therethrough while those portions of object beam 12*c* that were rotated counterclockwise $-2\phi$ are not passed therethrough. Accordingly, object beams 12*d* which are transmitted by analyzer 78 are a plurality of separate beams whose axis of polarization has been rotated clockwise $+2\phi$ and whose spatial distribution conforms to the spatial distribution of the cylindrical domains 44 of platelet 42 of page composer 40 —see FIG. 3. The object beams 12*d* are then directed incident upon the deflector 24 which deflects and focuses or compresses such object beams 12 *d* upon the one selected area on holographic storage medium 22 in which the page of data is to be stored by the concurrent affecting by reference beam 12*b*.

Figure 7:
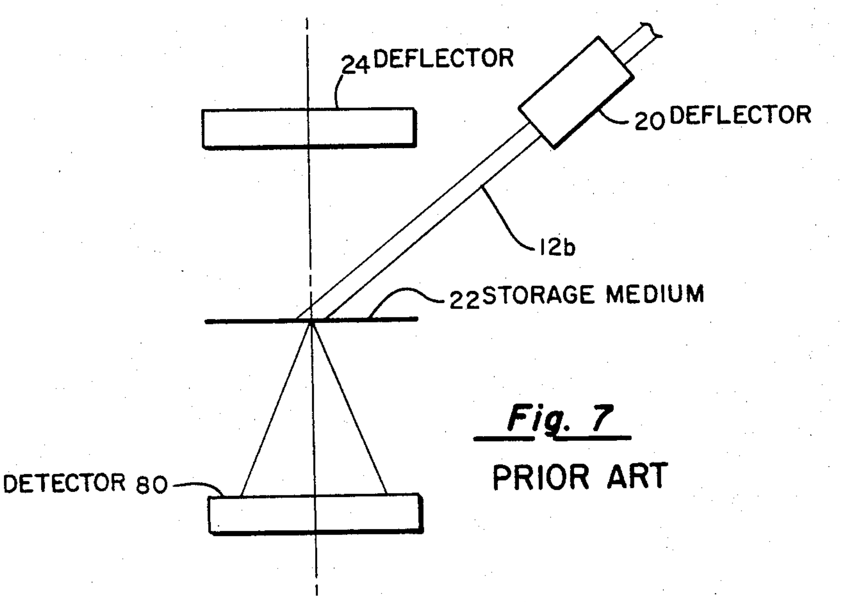
Fig. 7 PRIOR ART
FIG. 7 is an illustration of a system for reading out the one selected hologram of FIG. 6.

With particular reference to FIG. 7 there is illustrated a prior art read ssstem for readout of the one selected page 60 of the data or hologram stored in holographic storage medium 22. The reference beam 12*b* being focused upon the one selected page 60 of data stored in holographic storage medium 22 projects upon photo detector array 80 a holographic reproduction of the data stored in the one selected page 60 of holographic storage medium 22—see FIG. 6.

Although the operation of the system of FIG. 2 was described as using the Faraday effect it is to be understood that the Kerr effect could be utilized. Using the Faraday effect the material constituting the platelet 42 of FIG. 3 permits the incident object beam 12*a* to pass through and upon being reflected by the mirror 72 be passed through again in the opposite direction. However, using the Kerr effect the material constituting the platelet 42, of FIG. 3 does not permit the incident object beam 12*a* to pass through but does reflect such object beam 12*a* off its near surface. The object beam 12*a* impinges upon the near surface of platelet 42 and is reflected back along transmission axis 13 having its plane of polarization rotated in a manner similar to that discuseed with respect to FIGS. 4, 5. The operation therefter is as discussed above.

Figure 8:
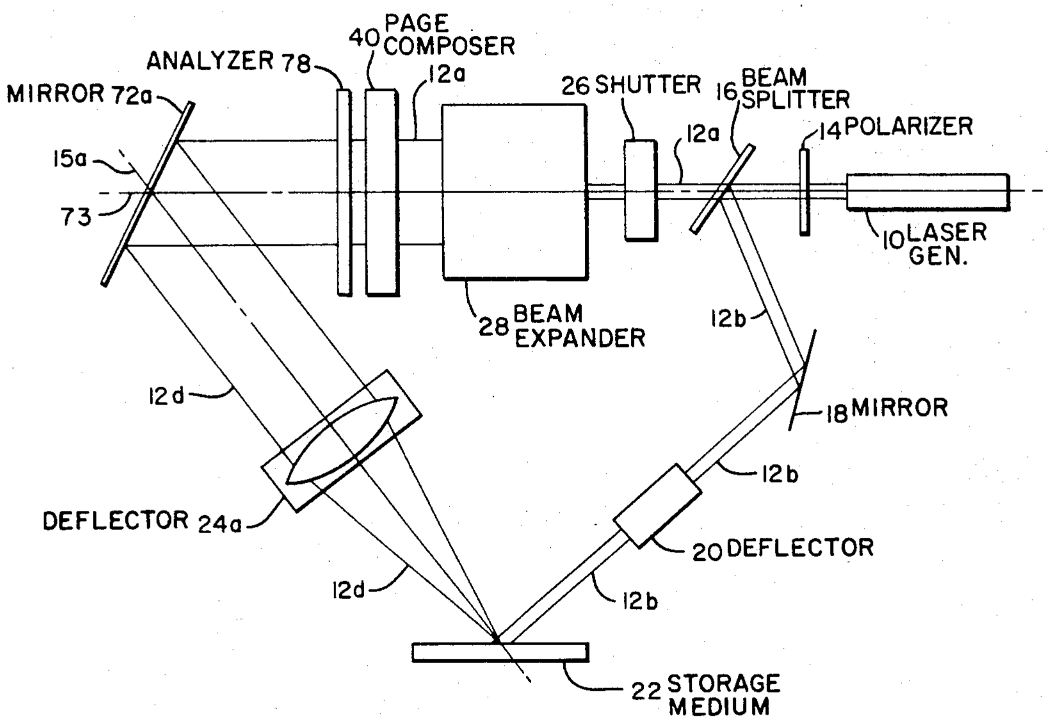
FIG. 8 is an illustration of a holographic memory system which is a slight modification of that of FIG. 2.

Additionally, in contrast to the holographic memory system of FIG. 2, another configuration using the Faraday effect could be as illustrated in FIG. 8. In this system beam splitter 70 is eliminated and mirror 72 is separated from the far surface of page composer 40 into a new tilted position as mirror 72*a* from which the object beam 12*c* is directed along transmission axis 15*a* and upon holographic storage medium 22 by means of deflector 24*a*. The operation of such system is similar to that of FIG. 2 except that the object beam 12*a* passes through platelet 42 of page composer 40 only once.

What is claimed is:

1. In a holographic memory system in which a page composer modulates a plane polarized, coherent, monochromatic light beam to store in a holographic storage medium in conjunction with a reference beam a hologram of the data that is carried in the modulated beam, the method of modulating said beam comprising:

forming a thin planar layer of magnetizable material having Faraday effect rotation of an incident plane polarized, coherent, monochromatic light beam;

initially, uniformly magnetically orienting the magnetization vector M of said layer in a first magnetization direction normal to its plane surface;

secondly, switching selected portions of said layer for magnetically orienting the magnetization vector M of said selected portions of said layer in a second magnetization direction, opposite to the first magnetization direction of the remaining portion of said layer, normal to its plane surface;

directing a plane polarized, coherent, monochromatic light beam along a first transmission axis normally incident to a planar surface of said layer;

rotating in a first angular direction the plane of polarization of said incident light beam in the area of said layer whose magnetization vector M is oriented in said first magnetization direction;

rotating in a second angular direction, opposite to said first angular direction, the plane of polarization of said incident light beam in the areas of said selected portions of said layer whose magnetization vector M is oriented in said second magnetization direction;

orienting a planar mirror on the back side of said layer to deflect said light beam back through said layer and along said first transmission axis for further rotating the planes of polarization of said once rotated planes of polarization in like first or second angular directions;

directing said selectively plane polarized light beam incident to an analyzer for transmitting therethrough substantially only those portions of said beam whose plane of polarization has been twice rotated in said second angular direction;

forming a plurality of parallel beams whose plane of polarization has been twice rotated in said second direction and whose spatial distribution in a plane normal to their transmission axis conforms to the spatial distribution of said selected portions of said layer.

2. A holographic memory system including a selectively alterable page composer for modulating a plane polarized, coherent, monochromatic light beam and storing in a holographic storage medium a hologram of the data that is carried in the modulated beam, the system comprising:

means for generating a coherent, monochromatic light beam;

means for plane polarizing said beam long a first polarization axis;

means for forming an object beam and a reference beam from said plane polarized beam;

page composer means including a thin planar layer of magnetizable material having a Faraday effect rotation of an incident plane polarized, coherent, monochromatic light beam and means for:

uniformly magnetically orienting the magnetization vector M of said layer in a first magnetization direction normal to its surface; and, switching selected portions of said layer for magnetically orienting the magnetization vector M of said selected portions of said layer in a second magnetization direction, opposite to the first magnetization direction of the remaining portion of said layer, normal to its surface;

means for directing said object beam along a first transmission axis normally incident to said page composer for:

rotating in a first angular direction the plane of polarization of said object beam that is incident to the area of said layer whose magnetization vector M is oriented in said first magnetization direction; and, rotating in a second angular direction, opposite to said first angular direction, the plane of polarization of said object beam that is incident to the areas of said selected portions of said layer whose magnetization vector M is oriented in said second magnetization direction;

means oriented on the back side of said page composer to deflect said light beam back through said layer along said first transmission axis for further rotating the planes of polarization of said once rotated planes of polarization in like first or second angular directions;

means for transmitting substantially only those portions of said beam whose plane of polarization has been twice rotated in said second angular direction and forming a plurality of parallel beams;

means for concurrently directing said reference beam and said plurality of parallel beams upon a selected area of a holographic storage medium for storing therein a hologram of the data carried in said plurality of parallel beams.

* * * * *